(12) United States Patent
Kimura et al.

(10) Patent No.: US 7,597,303 B2
(45) Date of Patent: Oct. 6, 2009

(54) VEHICLE POWER SEAT SLIDE DEVICE

(75) Inventors: Toshihiro Kimura, Toyota (JP);
Yoshitaka Nakamura, Toyota (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 456 days.

(21) Appl. No.: 11/311,653

(22) Filed: Dec. 20, 2005

(65) Prior Publication Data

US 2006/0186687 A1    Aug. 24, 2006

(30) Foreign Application Priority Data

Dec. 21, 2004    (JP)    ............................. 2004-370048

(51) Int. Cl.
*F16M 13/00*    (2006.01)
(52) U.S. Cl. ...................................... 248/429; 248/424
(58) Field of Classification Search ................ 248/424, 248/429; 296/65.15; 411/111, 113
See application file for complete search history.

(56) References Cited

U.S. PATENT DOCUMENTS

| | | | | |
|---|---|---|---|---|
| 5,048,786 | A * | 9/1991 | Tanaka et al. ................ | 248/429 |
| 5,342,013 | A * | 8/1994 | Ito et al. ...................... | 248/429 |
| 5,447,352 | A * | 9/1995 | Ito et al. ..................... | 296/65.14 |
| 5,467,957 | A * | 11/1995 | Gauger ......................... | 248/429 |
| 5,711,184 | A * | 1/1998 | Pryor et al. ................. | 74/89.36 |
| 5,769,377 | A * | 6/1998 | Gauger ......................... | 248/429 |
| 5,797,293 | A * | 8/1998 | Chaban ....................... | 74/89.36 |
| 5,816,555 | A * | 10/1998 | Ito et al. ...................... | 248/429 |
| 5,860,319 | A * | 1/1999 | Via ............................... | 74/89.36 |
| 5,873,558 | A * | 2/1999 | Sakamoto .................... | 248/429 |
| 6,138,974 | A * | 10/2000 | Okada et al. ................. | 248/429 |
| 6,220,642 | B1 * | 4/2001 | Ito et al. .................... | 296/65.14 |
| 6,244,660 | B1 * | 6/2001 | Yoshimatsu ............... | 297/344.1 |

(Continued)

FOREIGN PATENT DOCUMENTS

EP    2000-158983    6/2000

(Continued)

OTHER PUBLICATIONS

Extended European Search Report dated Apr. 19, 2006 with discussion of cited references.

*Primary Examiner*—J. Allen Shriver, II
*Assistant Examiner*—Michael McDuffie
(74) *Attorney, Agent, or Firm*—Buchanan Ingersoll & Rooney PC (57) ABSTRACT

A vehicle power seat slide device includes a first rail fixed to a vehicle, a second rail fixed to a seat and slidably supported by the first rail, a nut member fixed to the first rail by means of a bracket, a screw shaft rotatably supported by the second rail and screwed into the nut member, a driving mechanism supported by the second rail for driving the screw shaft so as to rotate, the screw shaft being rotated by the driving mechanism relative to the nut member, the second rail being moved so as to slide relative to the first rail by means of the shaft screwing into the nut member, the nut member including a protruding portion fitted into a fitting hole, which is formed on the first rail, the nut member being supported by the bracket, and the bracket fixed to the first rail together with the nut member.

20 Claims, 4 Drawing Sheets

U.S. PATENT DOCUMENTS

| | | | |
|---|---|---|---|
| 6,688,667 B2 * | 2/2004 | Nishimoto et al. | 296/65.15 |
| 6,948,693 B2 * | 9/2005 | Goodbred | 248/429 |
| 6,971,620 B2 * | 12/2005 | Moradell et al. | 248/422 |
| 7,048,244 B2 * | 5/2006 | Hauck | 248/430 |
| 7,303,223 B2 * | 12/2007 | Nakamura et al. | 296/65.15 |

FOREIGN PATENT DOCUMENTS

| | | |
|---|---|---|
| FR | 2 796 013 | 1/2001 |
| JP | 2000-158983 | 6/2000 |

* cited by examiner

VEHICLE POWER SEAT SLIDE DEVICE

CROSS REFERENCE TO RELATED APPLICATIONS

This application is based on and claims priority under 35 U.S.C. § 119 to Japanese Patent Application 2004-370048, filed on Dec. 21, 2004, the entire content of which is incorporated herein by reference.

FIELD OF THE INVENTION

The present invention relates to a vehicle power seat slide device.

BACKGROUND

A known power seat slide device disclosed in, for example JP2000-158983A, includes a lower rail fixed to a vehicle floor, an upper rail slidably supported to the lower rail in order to support a vehicle seat, a nut member fixed to the lower rail, a screw shaft screwed into a nut member, which is rotatably supported by the upper rail, and a gear box supported by the upper rail and connected to the screw shaft and the electric driving source.

When the known device rotates the screw shaft relative to the nut member through the gear box by the electric driving source, the screw shaft is screwed into the nut member, and then the upper rail is moved so as to slide relative to the lower rail. Thus a position of the vehicle seat relative to the vehicle floor can be adjusted in a vehicle front-rear direction.

Further, the nut member, into which the screw shaft is screwed, is fixed to the lower rail by use of a bracket screwed to the lower rail with bolts so as not to slide in a longitudinal direction (a front-rear direction) of the rail.

According to the known device, when a load is applied to the upper rail in a vehicle front-rear direction, the load transmits from the upper rail, which is attached to the vehicle seat, to the screw shaft, witch is engaged with the upper rail. At this point, because the upper rail is limited so as not to slide relative to the lower rail by means of the nut member into which the screw shaft is screwed, the load applied in a vehicle front-rear direction transmits to the nut member through the screw shaft. Then, the load transmitted to the nut member is absorbed by the bracket, which is fixed to the lower rail in order to maintain the nut member. However, if the nut member is not supported by the bracket appropriately, the excessive load at the time of, for example the vehicle collision, transmits from the screw shaft to the gear box, as a result a bending stress may occurs on the screw shaft.

In order to secure the nut member appropriately, the thickness of the bracket has been set to be larger, a reinforcement has been welded to the bracket, and the bracket has been formed in a chambered-shape. However, these measures result in increasing the costs of the seat slide device, in addition, the welding may result in degradation on a dimensional accuracy due to heat distortion. The costs is further increased when the bracket is processed in the chambered-shape, and if such chambered-shaped bracket is provided within the rail, more space needs to be provided, as a result, the costs is further increased, in addition, the total weight of the power seat slide device has been increased.

A need thus exists to provide a vehicle power seat slide device, which maintains a nut member appropriately in a simple configuration, at the same time, the device can be downsized and reduced in weight.

SUMMARY OF THE INVENTION

According to an aspect of the present invention, a vehicle power seat slide device includes a first rail fixed to a vehicle, a second rail fixed to a seat and slidably supported by the first rail, a nut member fixed to the first rail by means of a bracket, a screw shaft rotatably supported by the second rail and screwed into the nut member, a driving mechanism supported by the second rail for driving the screw shaft so as to rotate, the screw shaft being rotated by the driving mechanism relative to the nut member, the second rail being moved so as to slide relative to the first rail by means of the shaft screwing into the nut member, the nut member including a protruding portion fitted into a fitting hole, which is formed on the first rail, the nut member being supported by the bracket; and the bracket fixed to the first rail together with the nut member.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

First Embodiment

A first embodiment of the present invention will be explained in accordance with the attached FIGS. 1 through 3. Specifically, in the first embodiment, a power seat slide device, to which the present invention is applied, is mounted to, for example a front seat of a vehicle. In the first embodiment, a front-rear direction, a right-left direction and an upper-lower direction is defined relative to the vehicle.

Figure 1:
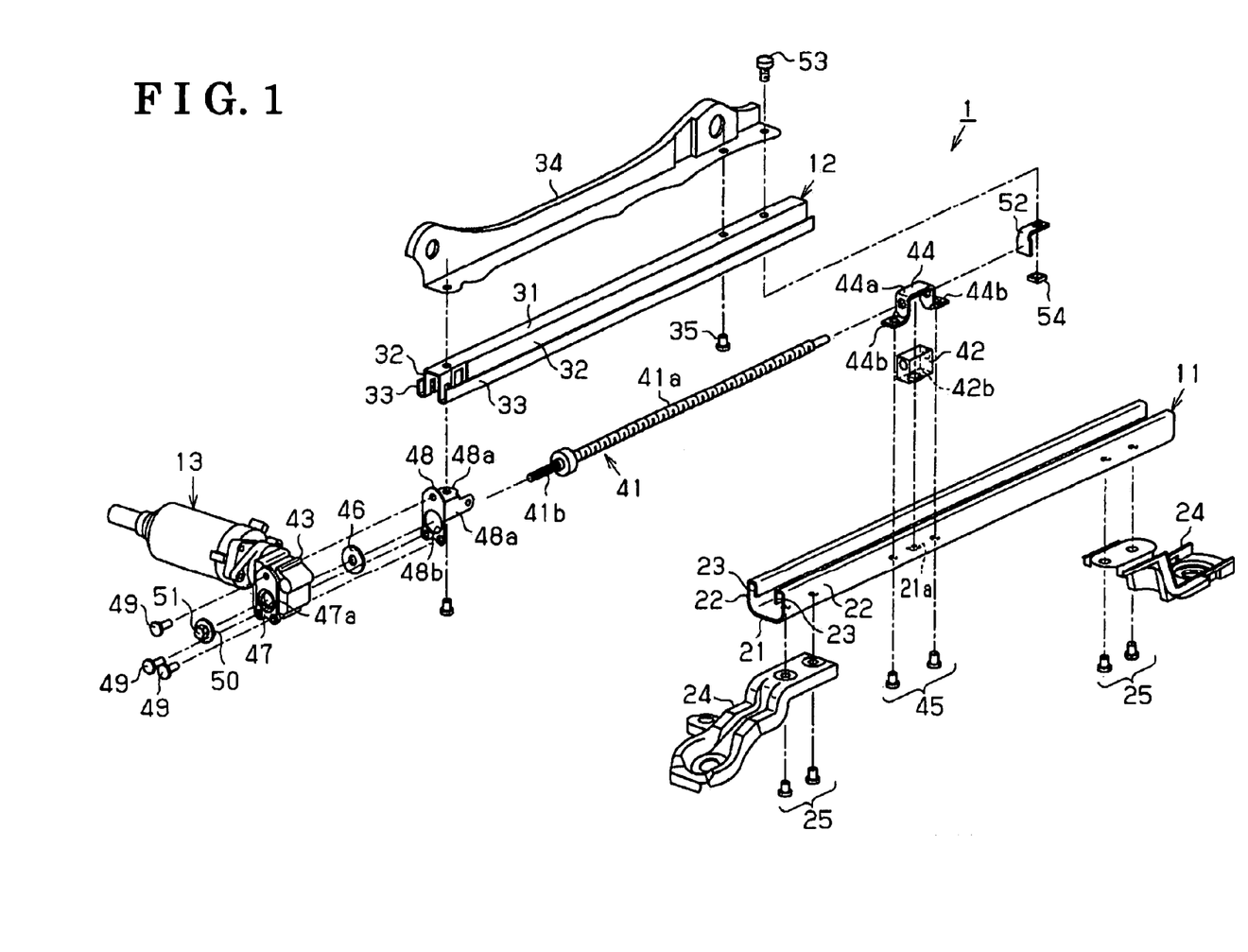
FIG. 1 illustrates an exploded perspective view of a first embodiment of vehicle power seat slide device.

FIG. 1 illustrates an exploded perspective view of a first embodiment of a power seat slide device. The power seat slide device 1 mainly includes a lower rail 11 (e.g., serving as a first rail), an upper rail 12 (e.g., serving as a second rail) and a driving mechanism 13.

The lower rail 11 is formed in a long shape so as to extend in a vehicle front-rear direction. Specifically, the lower rail 11 is formed in an approximate U-shaped in its cross section so as to include a bottom portion 21 and a pair of side walls 22, which extends from each end in a width direction of the bottom portion 21 in an upward direction and sandwiches the bottom portion 21 therebetween in its cross section, and each of the side walls 22 includes a flange portion 23, which extends inward from a top end of each of the side walls 22 and then is bent in a downward direction. A brackets 24 is attached by means of a rivet 25 to the bottom portion 21 of the lower rail 11 at a front end thereof, and another bracket 24 is attached by means of another rivet 25 to the bottom portion 21 of the lower rail 11 at a rear end thereof, and thus the lower rail 11 is fixed to the vehicle floor (not shown) by means of the brackets 24. In this embodiment, the lower rail 11 configures the first rail.

The upper rail 12 is formed in a long shape so as to extend in a vehicle front-rear direction. Specifically, the upper rail 12 is formed in an approximate U-shaped in its cross section so as to include an upper portion 31 and a pair of side walls 32, which extends from each end in a width direction of the upper portion 31 in a downward direction and sandwiches the upper portion 31 therebetween in its cross section, and each of the side walls 32 includes a flange portion 33, which extends outward from a bottom end of each of the side walls 32 and then is bent an upward direction. A bracket 34 is attached by means of a rivet 35 to the upper rail 12 at the upper portion 31 thereof, and the upper rail 12 is fixed to the vehicle seat (not shown) by means of the bracket 34.

Thus, the upper rail 12 is supported by the lower rail 11 so as to be slidable in a longitudinal direction thereof (in a front-rear direction of the vehicle), in a manner where the flange portions 33 of the upper rail 12 are engaged with the flange portions 23 of the lower rail 11 by means of a shoe (not shown). When the flange portions 33 of the upper rail 12 are engaged with the flange portions 23 of the lower rail 11 by means of the shoe, an inner space A is formed between the lower rail 11 and the upper rail 12 as shown in FIG.3.

The driving mechanism 13 mainly includes a screw shaft 41, a nut member 42 and a gear box 43. The screw shaft 41 is provided within an inner space A so as to extend in a longitudinal direction of the rails, and a front end of the screw shaft 41 is rotatably supported by the upper portion 31 of the upper rail 12. The nut member 42 is made of a resin, for example a resin in which glass fiber is added to 66 nylon resin. The nut member 42 is fixed to the bottom portion 21 of the lower rail 11 by means of a rivet 45, together with a bracket 44, which is made of a metal material. The screw portion 41a of the screw shaft 41 is screwed into the nut member 42.

Figure 2:
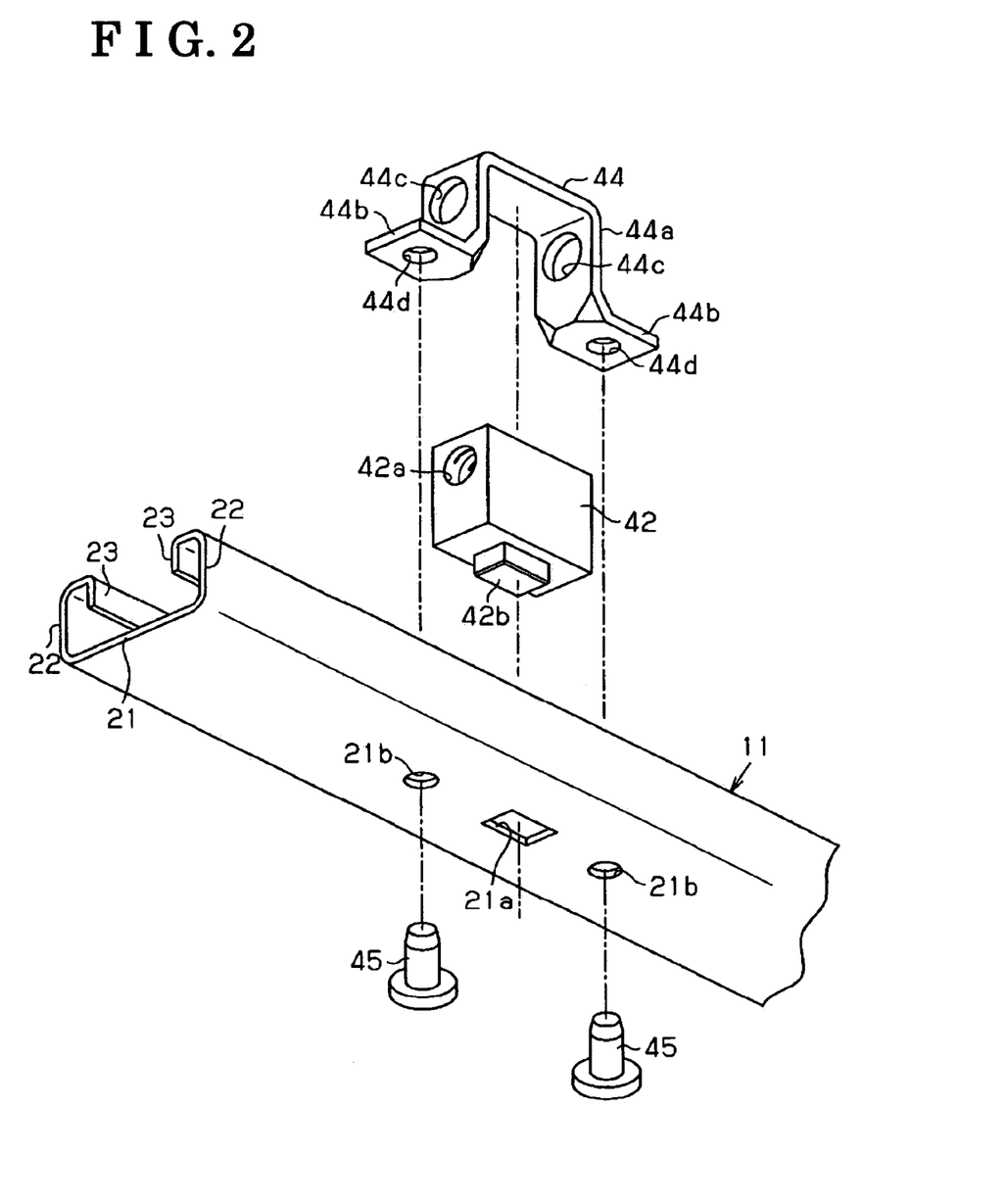
FIG. 2 illustrates an enlarged perspective view indicating a nut member and a bracket.
Figure 3:
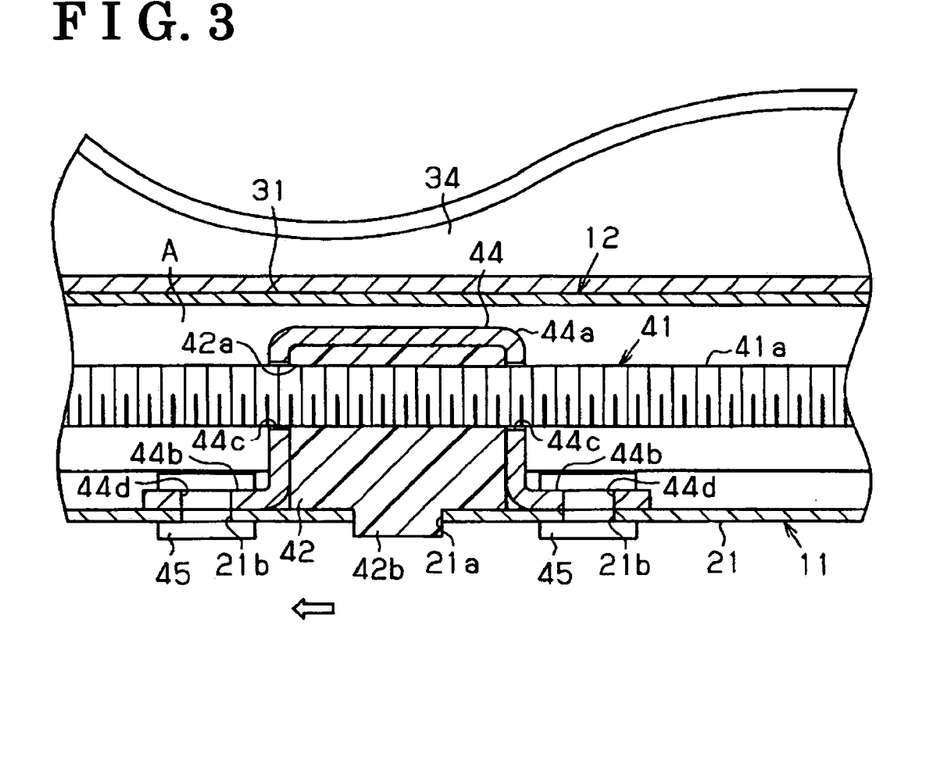
FIG. 3 illustrates a partial cross section indicating the vehicle power seat slide device.

Specifically, as shown in FIG. 2, the nut member 42 is formed in an approximate box shape and includes a screw portion 42a (female screw), into which the screw portion 41 a (male screw) of the screw shaft 41 is screwed. The nut member 42 further includes a protruding portion 42b on a surface facing the lower rail 11. The protruding portion 42b is formed integrally with the nut member 42 in this embodiment. The bracket 44 includes a fitting wall 44a, which is formed in an approximate U-shape, and further includes flange portions 44b, which extend from each of the front and the rear ends of the fitting wall 44a so as to extend in a font-rear direction of the bracket 44. Further, the fitting wall 44a includes a front wall and a rear wall, and on each of the front wall and the rear wall, a hole 44c is formed so as to be coaxial, and, on each of the flange portions 44b, a hole 44d into which the rivet 45 is inserted is formed. A fitting hole 21a, into which the protruding portion 42b of the nut member 42 is fitted, and holes 21b, into which the rivets 45 are inserted, are formed on the bottom portion 21 of the lower rail 11. The nut member 42 is supported by the lower rail 11 so as not to move in a front-rear direction and a right-left direction in a manner where the protruding portion 42b of the nut member 42 is fit into the fitting hole 21a of the lower rail 11. Further, the bracket 44 is fit to the nut member 42 in a manner where the fitting wall 44a of the racket 44 contacts the upper, front and rear surfaces of the nut member 42. The nut member 42 is fixed to the lower rail 11 together with the bracket 44 in a manner where the bracket 44 is fixed to the lower rail by means of the rivets 45, which are inserted into the holes 44d formed on the flanges 44b of the bracket 44 and the holes 21 b formed on the lower rail 11. Thus, the nut member 42 is firmly supported to the lower rail 11 by the bracket 44 and limited so as also not to slide in a vertical direction by means of the bracket 44. Thus, in the first embodiment, because the nut member 42 is fixed to the lower rail 11 together with the bracket 44, the configuration of the bracket 44 can be simplified, at the same time; the nut member 42 is appropriately supported by the lower rail 11.

The gear box 43 houses a reduction gear mechanism (not shown), which includes worm wheel gears and worm gears inside thereof. Specifically, the gear box 43 is positioned at the front portion of the upper rail 12 and supported to the upper rail 12 by means of the bracket 47 and the bracket 48. The bracket 47 and the bracket 48 are fixed to the gear box 43 by means of the screw 49 in a manner where the gear box 43 is sandwiched between the bracket 47 and the bracket 48, and the gear box 43 is fixed to the upper rail 12 together with the bracket 47 and the bracket 48 by use of plural flange portions 48a of the bracket 48.

The front end portion of the screw shaft 41 is inserted into a hole 48b formed on the bracket 48 and further inserted into a washer 46, and then penetrates through the gear box 43. The front end portion of the screw shaft 41, which penetrates through the gear ox 43, is further inserted into a hole 47a formed on the bracket 47, and further inserted into a washer 50, which is provided so as to be paired with the washer 46. Furthermore, a nut 51 is fitted to the front end portion of the screw shaft 41 in order to prevent the screw shaft 41 from being pulled out from the gear box 43. A serration portion 41a is formed at the front end of the screw shaft 41, which penetrates through the gear box 43, and the serration portion 41 b of the screw shaft 41 is engaged with the worm wheel gear of the decelerating gear mechanism within the gear box 43 so as to rotate together. The worm gear of the decelerating gear mechanism is connected to a motor (not shown), which serves as an electric driving source, by means of a torque transmitting member (not shown), such as a cable.

A stopper 52 formed in an approximate reversed L shape is provided at a rear end portion of the bracket 44, which is used for fixing the nut member 42 to the lower rail 11. The stopper 52 is made of a metal material and fixed to the upper rail 12 by a bolt 53 screwed into the nut 54.

According to the vehicle power sear slide device 1 configured as mentioned above, when the screw shaft 41 is rotated by means of the gear box 43, which is actuated by the motor; because the nut member 42 is fixed to the lower rail 11, the screw shaft 41 is moved in an axial direction thereof relative to the nut member 42, as a result, the upper rail 12 slides relative to the lower rail 11. Thus, the position of the vehicle seat can be adjusted in a front-rear direction relative to the vehicle floor. Further, because the screw shaft 41 is screwed into the nut member 42, even when a load is applied to the upper rail 12 in a vehicle front-rear direction, the upper rail 12 can be regulated so as not to slide relative to the lower rail 11, as a result, the vehicle seat can be supported at a required position. The movement of the screw shaft 41 in an axial direction toward the rear end thereof can be regulated by means of the stopper 52.

In accordance with FIG.3, actuations of the nut member 42 and the bracket 44 will be explained below. At the time of a vehicle collision, when a large load is applied to the upper rail 12 in a vehicle front direction (a direction indicated by an arrow in FIG.3), the load is transmitted to the nut member 42, into which the screw shaft 41 is screwed. At this point, because the nut member 42 is supported by the fitting wall 44a of the bracket 44 in a manner where the fitting wall 44a of the bracket 44 contacts the upper, front and rear surfaces of the nut member 42, the load transmitted to the nut member 42 is transmitted to the bracket 44, and further transmitted to the lower rail 11. Thus, the load transmitted to the nut member 42 can be absorbed by the bracket 44. At this point, because the nut member 42 is fixed to the lower rail 11 by means of the protruding portion 42b formed on the nut member 42 itself, the load applied to the nut member 42 in a vehicle front direction can also be absorbed by a fitting surface between the protruding portion 42b and the fitting hole 21a. In this configuration, by firmly maintaining the nut member 42 to the lower rail 11, the load transmitted from the screw shaft 41 to the gear box 43 can be appropriately reduced. In this embodiment, a load is applied in a front direction of the vehicle, however, even when the load is applied in a rear direction of the vehicle, the load can be absorbed appropriately by means of the nut member 42 and the bracket 44.

As mentioned above, following effects can be obtained according to this embodiment. The nut member 42 is fixed to the lower rail 11 together with the bracket 44 in a manner where the protruding portion 42b, which is formed on the bottom portion of the nut member 42, is fit into the fitting hole 21a, which is formed on the bottom portion 21 of the lower rail 11. Thus, the load applied in a vehicle front-rear direction to the nut member 42 can be absorbed appropriately by means of the nut member 42 and the bracket 44. As a result, a level of the maintaining force by which the nut member 42 is supported by the lower rail 11 can be enhanced, chances of a deformation of the screw shaft 41, and a damage on the gear box can be reduced, at the same time, a level of strength of the seat slide device can be enhanced.

Further, because the nut member 42 can be supported to the lower rail 11 by means of the protruding portion 42b of the nut member 42, a structure of the bracket 44 can be simplified, and the thickness of the bracket 44 can be reduced. Thus, a molding process of the nut member 42 can be simplified, as a result, cost can be reduced.

Because the nut member 42 is supported by the lower rail 11 by means of the protruding portion 42b of the nut member 42, and the structure of the bracket 44 is simplified, an area of a cross section of the rails can be downsized. Thus, the device as a whole can be downsized and reduced in weight.

Because the nut member 42 is supported by the lower rail 11 in a manner where the racket 44 contacts the upper, front and rear surface of the nut member 42. Thus, a level of strength of the device can be enhanced by a simple structure, specifically only by the nut member 42 and the bracket 44.

The protruding portion 42b of the nut member 42 is fitted into the fitting hole 21a of the lower rail 11, and the nut member 42 can be positioned relative to the lower rail 11. Thus, a degree of accuracy of the positioning of the nut member 42 can be determined by only an accuracy of the fitting hole 21a, and the nut member 42 can be positioned relative to the lower rail 11 in a simple manner.

Second Embodiment

Next, a second embodiment of the present invention will be explained in accordance with FIG. 4. Because the second embodiment has basically the same configuration as the first embodiment, only the differences from the first embodiment will be explained.

The second embodiment basically has a same structure as that of the first embodiment. In the second embodiment, a shape of the nut member 42 differs from that of the first embodiment. In both embodiments, same numerals are applied to the same parts.

Figure 4:
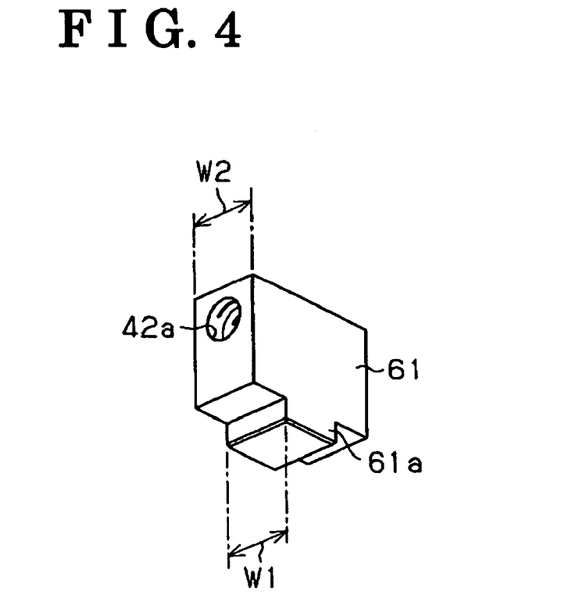
FIG. 4 illustrates a perspective view indication a nut member of a second embodiment.

As shown in FIG. 4, a width WI of a protruding portion 61a, which is formed at the nut member 61 is set to be identical to a width W2 of a nut member 61 in a right-left direction. When the width WI of the protruding portion 61a is increased to the width W2 of the nut member 61, an area of a surface at which the protruding portion 61 a is fitted into the fitting hole 21a of the lower rail 11 can be increased. In other words, an area of a surface to which the load is applied from the lower rail 11 can be increased. Thus, the level of the maintaining force for maintaining the nut member 61 relative to the lower rail 11 can be more enhanced than that of the first embodiment.

Third Embodiment

Next, a third embodiment of the present invention will be explained in accordance with FIG. 5. Because the third embodiment has basically the same configuration as the first embodiment, only the differences from the first embodiment will be explained.

The third embodiment basically has a same structure as that of the first embodiment. In the third embodiment, a reinforcing member 71 is provided to a fitting portion between the protruding portion 42b of the nut member 42 and the fitting hole 21a of the lower rail 11. In both embodiments, same numerals are applied to the same parts.

Figure 5:
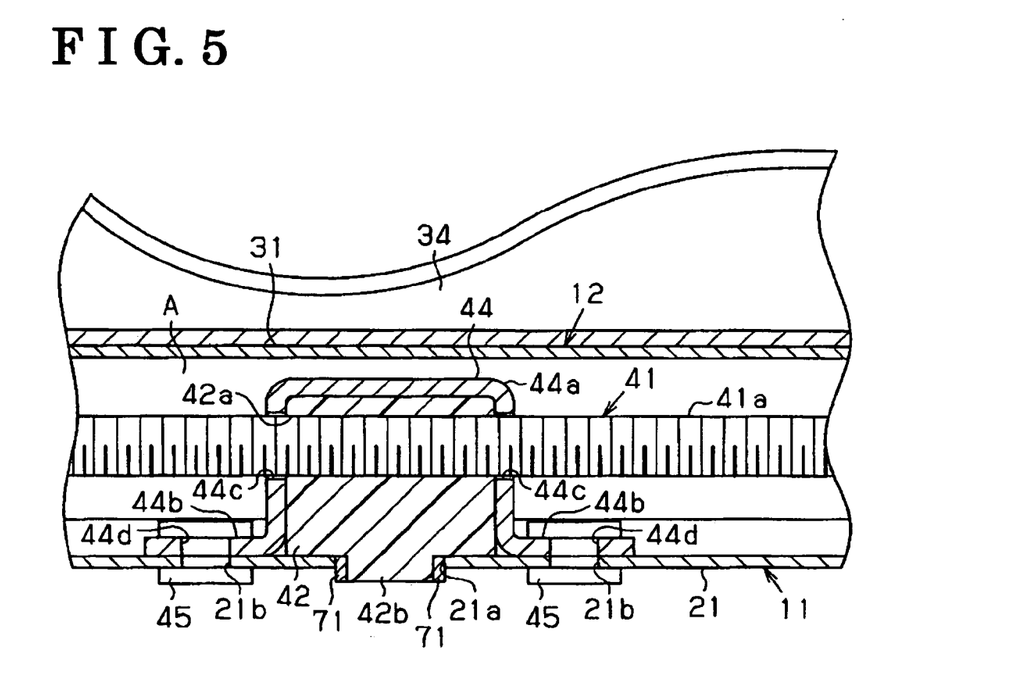
FIG. 5 illustrates a cross section indicating a reinforcing member of the third embodiment.

As shown in FIG. 5, a height of the reinforcing member 71 is set to be identical to that of the protruding portion 42b of the nut member 42, and a pair of the reinforcing members 71 is provided between the protruding portion 42b and the fitting hole 21a so as to be sandwiched therebetween. Specifically, one of the reinforcing members 71 is provided at front of the protruding portion 42b, and the other of the reinforcing members 71 is provided at rear of the protruding portion 42b. The reinforcing member 71 is made of, for example an iron plate. In this configuration, a load transmitted from the lower rail 11 to the protruding portion 42b, which is made of a resin material, can be dispersed to the reinforcing members 71, as a result, the level of the maintaining force for maintaining the nut member 42 relative to the lower rail 11 can be more enhanced than that of the first embodiment.

Fourth Embodiment

Next, a fourth embodiment of the present invention will be explained in accordance with FIG. 6. Because the fourth embodiment has basically the same configuration as the first embodiment, only the differences from the first embodiment will be explained.

The fourth embodiment basically has a same structure as that of the first embodiment, and only a configuration of the nut member 42 differs from that of the first embodiment. In both embodiments, same numerals are applied to the same parts.

Figure 6:
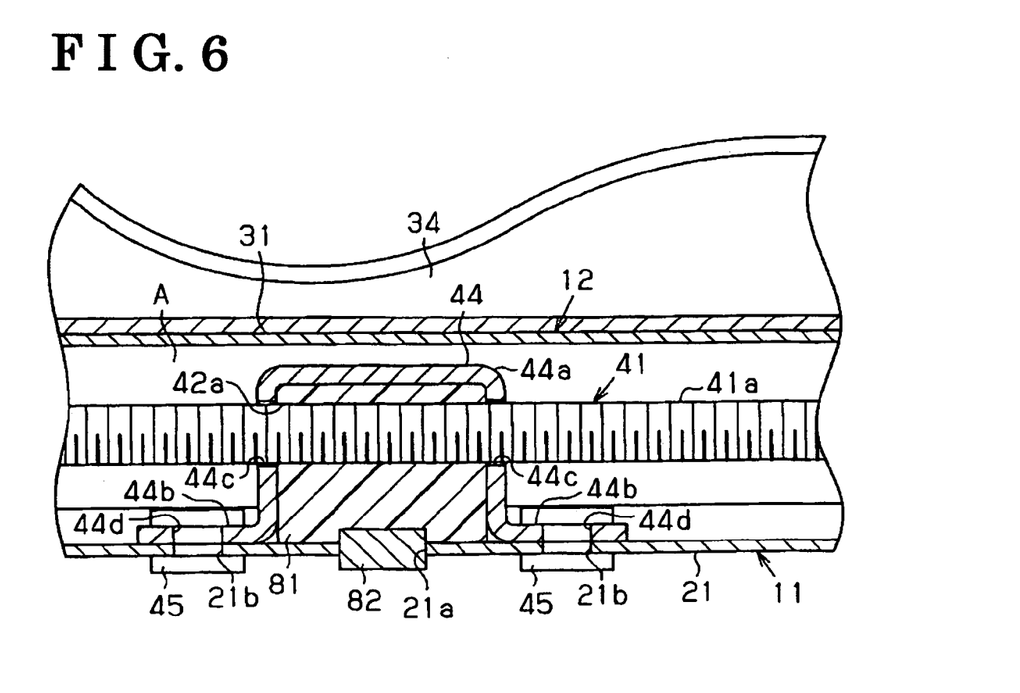
FIG. 6 illustrates a cross section indicating a nut member of the forth embodiment.

As shown in FIG. 6, a protruding portion 82 of a nut member 81 in the fourth embodiment is made of a metal material, for example, an iron material, so as to be independent from the nut member 81. Such nut member 81 can be molded by insert-molding the protruding portion 82. Thus, even when the protruding portion 82 is formed as an independent member and made of a metal material, same effects as the third embodiment can be obtained.

The above embodiments can be altered as follows. In the above embodiments, the lower rail 11 is used as the first rail, and the upper rail 12 is used as the second rail, however; the upper rail 12 may be fixed to the vehicle floor and used as the first rail, and the lower rail 11 may be fixed to the vehicle seat and used as a second rail. In this configuration, the nut member 42, 61 or 81 and the bracket 44 may be fixed to the upper rail 12.

In the above embodiments, the nut member 42, 61 or 81 includes the protruding portion 42b, 61a or 82, and the fitting hole 21a into which the protruding portion 42b, 61a or 82 is fitted is formed on the lower rail 11, however, the fitting hole 21a may be formed on the nut member 42, 61 or 81, and the protruding portion 42b, 61a or 82 may be formed on the lower rail 11.

In the second embodiment, the width W1 of the protruding portion 61a is set to be identical to the width W2 of the nut member 61, however, these widths may not be identical. Further, in the third embodiment, the height of the reinforcing member 71 is set to be identical to the height of the protruding portion 42b, however, the height of the reinforcing member 71 may be set to be identical to the thickness of the bottom portion 21 of the lower rail 11.

The shape and the configuration of the bracket 44 may not be limited to the above embodiments. For example, in each of the embodiments, the bracket 44 (the fitting wall 44a) is formed in a reversed U-shape, however, it may be formed in another shape, for example, the fitting wall 44a of the bracket 44 is not connected by such as a top portion, in other words, the front wall and the rear wall are provided independently, as far as the nut member 42, 61 or 81 can be intensely supported.

Each element related to the design of the vehicle power seat slide device 1 described above may be changed within a technical scope of the present invention.

According to the present invention, the nut member is supported by the first rail together with the bracket in a manner where the protruding portion of the nut member is fit into the fitting hole formed on the first rail. Thus, the structure and the configuration of the bracket can be simplified, at the same time; the nut member can be appropriately supported by the first rail. Thus, the device as a whole can be downsized and reduced in weight.

According to the present invention, because the width of the nut member is set so as to be identical with the width of the protruding portion, an area of a surface at which the protruding portion is fitted to the fitting hole of the first rail can be increased. In other words, an area of a surface to which the load is applied from the first rail can be increased. Thus, the level of the maintaining force for maintaining the nut member relative to the first rail can be more enhanced.

According to the present invention, the reinforcing members, which is made of, for example an iron plate, is provided between the protruding portion and the fitting hole so as to be sandwiched therebetween. In this configuration, a load transmitted from the first rail to the protruding portion, which is made of a resin material, can be dispersed to the reinforcing members, as a result, the level of the maintaining force for maintaining the nut member relative to the first rail can be more enhanced.

According to the present invention, the protruding portion may be made of a metal material and provided so as to be independent from the nut member. In this configuration, the level of the maintaining force for maintaining the nut member relative to the first rail can be more enhanced.

According to the present invention, the bracket includes the fitting wall, which is formed in an approximate reversed U-shape, in order to house the nut member inside thereof, in a manner where the fitting wall contacts the nut member at the front surface, the rear surface and the surface being opposed to the first rail thereof. Thus, chances that the protruding portion of the nut member is pulled off from the fitting hole can be reduced. Further, the load applied to the nut member in a front-rear direction can be absorbed by not only the fitting hole but also the fitting wall.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A vehicle power seat slide device comprising:
   a first rail fixed to a vehicle;
   a second rail fixed to a seat and slidably supported by the first rail;
   a bracket having flange portions extending in a longitudinal direction of the first rail from respective end portions of the bracket;
   a nut member made of resin and fixed to the first rail by means of the bracket;
   a screw shaft rotatably supported by the second rail and screwed into the nut member;
   a driving mechanism supported by the second rail for driving the screw shaft so as to rotate;
   the screw shaft being rotated by the driving mechanism relative to the nut member;
   the second rail being moved so as to slide relative to the first rail by means of the shaft screwing into the nut member;
   the nut member including a protruding portion fitted into a fitting hole, which is formed on the first rail;
   the nut member being supported by the bracket; and
   the bracket fixed to the first rail together with the nut member.

2. The vehicle power seat slide device according to claim 1, wherein a width of the nut member in a right-left direction of the vehicle rail is identical to that of the protruding portion.

3. The vehicle power seat slide device according to claim 1, wherein a reinforcing member made of a metal material is provided between the protruding portion and the fitting hole.

4. The vehicle power seat slide device according to claim 2, wherein a reinforcing member made of a metal material is provided between the protruding portion and the fitting hole.

5. The vehicle power seat slide device according to claim 1, wherein the protruding portion is made of a metal material and provided so as to be independent from the nut member.

6. The vehicle power seat slide device according to claim 2, wherein the protruding portion is made of a metal material and provided so as to be independent from the nut member.

7. The vehicle power seat slide device according to claim 1, wherein the bracket includes a fitting wall, which is formed in an approximate reversed U-shape, in order to house the nut member inside thereof, in a manner where the fitting wall contacts the nut member at a front surface, a rear surface and a surface being opposed to the first rail thereof.

8. The vehicle power seat slide device according to claim 2, wherein the bracket includes a fitting wall, which is formed in an approximate reversed U-shape, in order to house the nut member inside thereof, in a manner where the fitting wall contacts the nut member at a front surface, a rear surface and a surface being opposed to the first rail thereof.

9. The vehicle power seat slide device according to claim 3, wherein the bracket includes a fitting wall, which is formed in an approximate reversed U-shape, in order to house the nut member inside thereof, in a manner where the fitting wall contacts the nut member at a front surface, a rear surface and a surface being opposed to the first rail thereof.

10. The vehicle power seat slide device according to claim 4, wherein the bracket includes a fitting wall, which is formed in an approximate reversed U-shape, in order to house the nut member inside thereof, in a manner where the fitting wall contacts the nut member at a front surface, a rear surface and a surface being opposed to the first rail thereof.

11. The vehicle power seat slide device according to claim 5, wherein the bracket includes a fitting wall, which is formed in an approximate reversed U-shape, in order to house the nut member inside thereof, in a manner where the fitting wall contacts the nut member at a front surface, a rear surface and a surface being opposed to the first rail thereof.

12. A vehicle power seat slide device comprising:
a first rail fixed to a vehicle and provided with two through holes;
a second rail fixed to a seat and slidably supported by the first rail;
a nut member made of resin and fixed to the first rail by a bracket surrounding a portion of the nut member;
the bracket comprising a pair of holes each aligned with a respective one of the two through holes in the first rail and flange portions extending in a longitudinal direction of the first rail from respective end portions of the bracket;
a screw shaft rotatably supported by the second rail and screwed into the nut member;
a driving mechanism supported by the second rail to rotatably drive the screw shaft relative to the nut member;
the second rail being slid ably moved relative to the first rail by virtue of the shaft being screwed into the nut member; and
the nut member comprising a protruding portion fitted into a fifing hole formed on the first rail at a position spaced from the two through holes.

13. The vehicle power seat slide device according to claim 12, further comprising a pair of connecting elements, each connecting element extending through one of the holes in the bracket and through a respective one of the through holes in the first rail.

14. The vehicle power seat slide device according to claim 13, wherein the fitting hole in the first rail is positioned between the two through holes in the first rail that are aligned with the two holes in the bracket.

15. The vehicle power seat slide device according to claim 12, wherein the fitting hole in the first rail is positioned between the two through holes in the first rail that are aligned with the two holes in the bracket.

16. A vehicle power seat slide device comprising:
a first rail fixed to a vehicle;
a second rail fixed to a seat and slidably supported by the first rail;
a nut member made of resin and fixed to the first rail by a bracket;
the bracket comprising a fitting wall surrounding a portion of the nut member, and a pair of flange portions extending in a longitudinal direction of the first rail from the fitting wall;
a pair of connecting members each passing through a hole in one of the flange portions and a hole in the first rail;
a screw shaft rotatably supported by the second rail and screwed into the nut member;
a driving mechanism supported by the second rail to rotatably drive the screw shaft relative to the nut member;
the second rail being slid ably movable relative to the first rail by the shaft being screwed into the nut member; and
the nut member and the first rail engaging each other by way of a protruding portion fitted into a fitting hole, the protruding portion and the fitting hole being positioned between the connecting members.

17. The vehicle power seat slide device according to claim 16, wherein the connecting members are rivets.

18. The vehicle power seat slide device according to claim 16, wherein the fitting hole is formed in the first rail at a position between the two holes in the first rail that receive the connecting members.

19. The vehicle power seat slide device according to claim 16, wherein the protruding portion is made of a metal material and is independent from the nut member.

20. The vehicle power seat slide device according to claim 1, further comprising a pair of connecting elements, each connecting element extending through one of the holes formed at the respective flanges and through a respective one of the through holes in the first rail.

* * * * *

UNITED STATES PATENT AND TRADEMARK OFFICE
CERTIFICATE OF CORRECTION

| | | |
|---|---|---|
| PATENT NO. | : 7,597,303 B2 | Page 1 of 1 |
| APPLICATION NO. | : 11/311653 | |
| DATED | : October 6, 2009 | |
| INVENTOR(S) | : Kimura et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 746 days.

Signed and Sealed this

Twenty-eighth Day of September, 2010

David J. Kappos
*Director of the United States Patent and Trademark Office*